US007708362B2

(12) United States Patent
Heiles et al.

(10) Patent No.: US 7,708,362 B2
(45) Date of Patent: May 4, 2010

(54) PRINTHEAD ERROR COMPENSATION

(75) Inventors: Tod S. Heiles, Vancouver, WA (US); R. Joseph Megaw, Camas, WA (US); Hsue-Yang Liu, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1339 days.

(21) Appl. No.: 10/828,736

(22) Filed: Apr. 21, 2004

(65) Prior Publication Data

US 2005/0237351 A1 Oct. 27, 2005

(51) Int. Cl.
*B41J 29/38* (2006.01)
*B41J 29/393* (2006.01)
*G06F 15/00* (2006.01)

(52) U.S. Cl. ............................... 347/9; 347/19; 358/1.9

(58) Field of Classification Search ..................... 347/9, 347/19; 358/1.9
See application file for complete search history.

(56) References Cited

U.S. PATENT DOCUMENTS 5,172,190 A 12/1992 Kaiser
5,189,521 A 2/1993 Ohtsubo et al.
5,250,956 A 10/1993 Haselby et al.
5,289,208 A 2/1994 Haselby
5,297,017 A 3/1994 Haselby et al.
5,353,052 A 10/1994 Suzuki et al.
5,404,020 A 4/1995 Cobbs
5,448,269 A 9/1995 Beauchamp et al.
5,451,990 A 9/1995 Sorenson et al.
5,774,140 A 6/1998 English
6,000,776 A 12/1999 Suzuki et al.
6,076,915 A * 6/2000 Gast et al. ..................... 347/19
6,109,722 A 8/2000 Underwood et al.
6,161,914 A 12/2000 Haselby
6,196,652 B1 3/2001 Subirada et al.
6,198,549 B1 3/2001 Decker et al.
6,257,143 B1 7/2001 Iwasaki et al.
6,297,888 B1 10/2001 Noyes et al.
6,347,856 B1 2/2002 Arquilevich et al.
6,353,481 B1 3/2002 Lee
6,357,850 B1 3/2002 Liu
6,390,587 B1 5/2002 Subirada
6,416,151 B1 7/2002 Otsuka et al.
6,450,607 B1 9/2002 Bolash et al.
6,454,390 B1 9/2002 Takahashi et al.
6,474,767 B1 11/2002 Teshigawara et al.

(Continued)

FOREIGN PATENT DOCUMENTS

EP 0 947 332 A2 10/1999

(Continued)

OTHER PUBLICATIONS

British Search Report for Application No. GB 0220967.4 dated Oct. 15, 2002, 3 pages.

*Primary Examiner*—Matthew Luu
*Assistant Examiner*—Jannelle M Lebron

(57) ABSTRACT

A method for calibrating one or more printheads includes printing a reference image using a first portion of image forming points of a first printhead, printing a diagnostic image using a second portion of image forming points of either the first printhead or a second printhead, detecting an optical density of the combined reference image and the diagnostic image and determining a compensation value based upon the optical density.

12 Claims, 8 Drawing Sheets

U.S. PATENT DOCUMENTS

| | | | |
|---|---|---|---|
| 6,532,026 B2 | 3/2003 | Takahashi et al. | |
| 6,547,360 B2 | 4/2003 | Takahashi et al. | |
| 6,554,388 B1 | 4/2003 | Wong et al. | |
| 6,554,390 B2 | 4/2003 | Arquilevich et al. | |
| 6,582,052 B2 | 6/2003 | Sarmast et al. | |
| 6,832,825 B1 * | 12/2004 | Nishikori et al. | 347/19 |
| 2002/0101469 A1 | 8/2002 | Wade et al. | |
| 2002/0126171 A1 | 9/2002 | Subirada et al. | |
| 2003/0058295 A1 | 3/2003 | Heiles et al. | |
| 2003/0210412 A1 * | 11/2003 | Ishibashi | 358/1.9 |

FOREIGN PATENT DOCUMENTS

| | | |
|---|---|---|
| EP | 0 955 177 A2 | 11/1999 |
| JP | 2000-127369 | 5/2000 |
| JP | 2000-127375 | 5/2000 |
| JP | 2001-105577 | 4/2001 |

* cited by examiner

PRINTHEAD ERROR COMPENSATION

BACKGROUND

It may be desirable, in some printer applications to have high alignment accuracy between printhead nozzles to improve print quality. However, manufacturing variations frequently result in misalignment of printhead nozzles. For example, columns of nozzles are frequently curved and the spacing between columns of nozzles may be irregular. These errors are known as scan axis directionality (SAD) errors. In other instances, a column of nozzles may be straight but tilted. This may be the result of the entire printhead being tilted about an axis perpendicular to the medium as a result of the individual column of nozzles being tilted relative to other columns of nozzles on the same printhead. These errors are commonly known as THETA Z errors.

DETAILED DESCRIPTION OF EXAMPLE EMBODIMENTS

Figure 1:
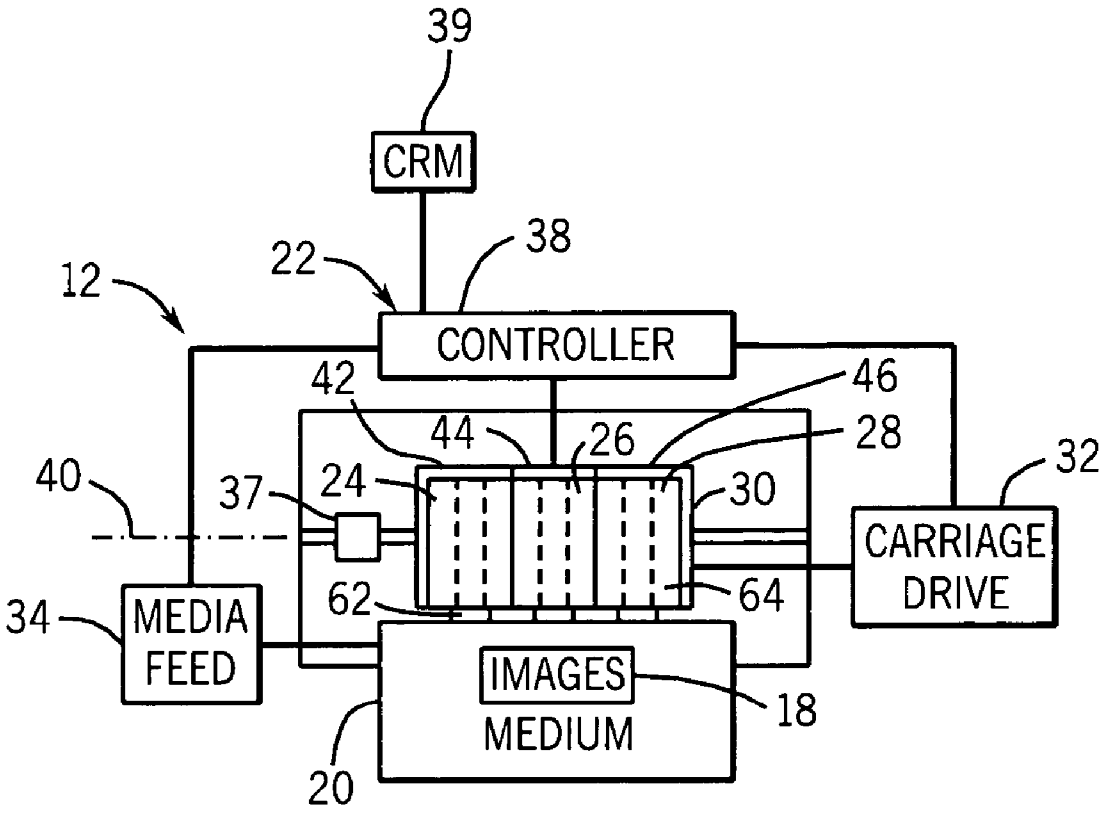
FIG. 1 is a schematic illustration of a printing system configured to provide horizontal printhead error compensation according to an exemplary embodiment

FIG. 1 is a schematic illustration of a printing system 12 configured to provide horizontal printhead error compensation. Printing system 12 is generally configured to print diagnostic images 18 upon a print medium 20, to analyze such images to determine an error compensation value and to modify printing based upon such error compensation values. System 12 includes printer 22 and print cartridges 24, 26 and 28. Printer 22 includes carriage 30, carriage drive 32, media feed device 34, sensor 37 and controller 38 and computer readable media 39. Carriage 30 generally comprises a structure configured to be moved back and forth across medium 20 along a scan axis 40 while supporting at least one print cartridge. In the particular embodiment illustrated, carriage 30 includes print cartridge locations 42, 44 and 46. Print cartridge locations 42, 44 and 46 generally comprise structures along carriage 30 that are configured to hold or retain an individual print cartridge. Print cartridge locations 42, 44 and 46 are configured such that each of print cartridges 24, 26 and 28 is interchangeable with one another. Carriage 30 may alternatively be configured to specifically support a particular one of print cartridges 24, 26 and 28. The exact configuration of such print cartridge locations may be varied depending upon the exact configuration of the ink print cartridge to be held or retained at the print cartridge location, as well as the type of connecting or supporting arrangement employed at each print cartridge location.

Carriage drive 32 is shown schematically and generally comprises an actuator configured to move carriage 30 along scan axis 40 across medium 20 in response to control signals from controller 38. Media feed device 34, schematically shown, comprises one or more mechanisms, such as belts, pulleys, drive rollers and motors, configured to feed and move medium 20 relative to carriage 30 and whatever print cartridges are supported at print cartridge locations 42, 44 and 46. The exact configuration of media feed device 34 may be varied depending upon the characteristics of medium 20 being fed past carriage 30. For example, media feed device 34 may have different configurations depending upon the particular dimensions of medium 20.

Sensor 37 comprises a mechanism configured to detect optical densities of diagnostic images 18 upon print medium 20. Sensor 37 generates electrical signals that are processed by controller 38. In the particular embodiment illustrated, sensor 37 is coupled to carriage 30 and is configured to be moved by carriage drive 32 along scan axis 40 across diagnostic images 18. In other embodiments, sensor 37 may be coupled to one or more of print cartridge locations 42, 44, 46, may be coupled to one of print cartridges 24, 26 or 28, may be movably coupled to another structure of printer 22 so as to move across or relative to diagnostic images 18 or may be stationarily coupled to a frame or other structure of printer 22, wherein media feed device 34 moves diagnostic images 18 relative to the sensor. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Controller 38 generally comprises a processor unit configured to generate control signals which are transmitted to carriage drive 32, media feed device 34 and whatever print cartridges 24, 26, 28 that are mounted to carriage 30. Controller 38 may comprise a processing unit that executes sequences of instructions contained in a memory (not shown). Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard-wired circuitry may be used in place of or in combination with software instructions to implement the functions described. Controller 38 is not limited to any specific combination of hardware circuitry and software, nor to any particular source for the instructions executed by the processing unit. Although controller 38 is illustrated as being physically incorporated as part of printer 22, controller 38 may alternatively be physically incorporated as part of another device such as a distinct computing device to which printer 22 is connected. In other embodiments, portions of controller 38 may be physically incorporated into distinct electronic devices, wherein such portions cooperate with one another. For example, a first portion of controller 38 may be located in printer 22 while a second portion of controller 38 is incorporated as part of a distinct computer.

Controller 38 receives data representing an image to be printed from a media reader, a computer, or directly from memory of a device, such as a video camera, digital camera, scanner and the like. Controller 38 further receives information from sensors (not shown) indicating the characteristics and locations of print cartridges 24, 26, 28 or other print cartridges mounted to carriage 30. Based upon such information, controller 38 controls carriage drive 32 to move carriage 30 along scan axis 40, controls media feed device 34 to move medium 20 relative to carriage 30 in directions generally perpendicular to scan axis 40, and controls the application of inks or other printing material from one or more of print cartridges 24, 26, 28 supported by carriage 30.

Computer readable media 39 generally comprises any form of media containing executable instructions that are readable by a computing device. Examples of computer readable media containing executable instructions that are readable by a computing device include: optical disks, magnetic disks or tape, and digital memory hardwired circuitry. The instructions contained by media 39 are used by controller 38 to generate control signals to achieve printhead horizontal error compensation. In particular, the instructions contained on media 39 direct controller 38 to generate control signals such that the following steps are performed in response to control signals generated by controller 38.

Initially, media feed device 34 positions media 20 in a first position relative to print cartridges 24, 26, 28. A diagnostic reference image 18 is printed upon medium 20 using a portion of a total of image forming points of printhead 62 of one of cartridges 24, 26 or 28. For purposes of the disclosure, the term "image forming points" shall mean any distinct point that causes an image to be formed upon a medium. In the particular embodiment illustrated, printhead 62 includes the plurality of individual image forming points which comprise nozzles configured to dispense fluid ink or other fluid printing material upon a medium. For purposes of this disclosure, the term "image" shall mean any mark or point or series of marks or points created upon a medium by either depositing a material upon the medium or interacting with the medium to activate materials within or on the medium.

Next, media feed device 34 moves media 20 relative to print cartridges 24, 26, 28 so as to vertically align a second portion of a total of image forming points of one of print cartridges 24, 26, 28 with the diagnostic reference image. For purposes of this disclosure, the term "vertical" refers to a direction perpendicular to scan axis 40. Likewise, the term "horizontal" refers to a direction parallel to scan axis 40. A diagnostic alignment image is printed upon print medium 20 using the second portion of image forming points. Sensor 37 scans a combination of the first diagnostic reference image 18 and the second diagnostic alignment image 18 to produce an electrical signal corresponding to an optical density of the combined first diagnostic image and second diagnostic image.

This process is repeated. Each time the process is repeated, the particular printhead used to print the second diagnostic image is horizontally repositioned relative to the previous position of the printhead by a horizontal offset. As a result, multiple optical densities representing different locations of the printhead used to print the second diagnostic image are detected. Based on these differing optical densities and their corresponding horizontal offsets, controller 38 determines a printhead horizontal error compensation value. This horizontal error compensation value is then used by controller 38 to calibrate and properly position the second portion of image forming points along scan axis 40 during printing.

Print cartridges 24, 26 and 28 (schematically shown) are substantially identical to one another, except for different inks or ink combinations contained within the print cartridges. In particular, each of print cartridges 24, 26 and 28 generally comprises an inkjet print cartridge having a printhead 62 and a plurality of distinct chambers 64 which communicate with the printhead 62. Printhead 62 includes a plurality of individual image forming points, such as nozzles, wherein each chamber 60 is in communication with one or more of the plurality of nozzles. Based upon control signals from controller 38, image forming material, such as ink, is dispensed from the chambers 64 through the nozzles of printhead 62 onto print medium 20.

In the particular embodiment illustrated, each of print cartridges 24, 26 and 28 includes three chambers 64 in communication with printhead 62. An example of a three chambered ink jet print cartridge that may be employed is disclosed in U.S. Pat. No. 5,969,739 by Altendorf et al. which issued on Oct. 19, 1999, the full disclosure of which is hereby incorporated by reference. In other embodiments, one or more of print cartridges 24, 26 and 28 may only include a single chamber carrying a single ink or other printing material. Although printer 22 is illustrated for use with three print cartridges, printer 22 may alternatively be configured for use with a greater or fewer number of such single or multi-chamber print cartridges.

In other embodiments, printing system 12 may utilize other sources of ink or printing material besides cartridges 24, 26 and 28. For example, printing system 12 may alternatively utilize an off-axis ink supply fluid delivery system. In still other embodiments, printing system 12 may omit cartridges 24, 26 and 28 and may alternatively be configured to form images upon a medium using other image forming points other than nozzles of an ink jet printing system. For example, printing system 12 may alternatively use dye-sublimation, wherein printhead 62 includes image forming points comprising heating elements that vary in temperature. Printing system 12 may alternatively comprise a thermal wax printing system wherein printhead 62 includes image forming points comprising heated pins. In other embodiments, printing system 12 may comprise a thermal autochrome printing system in which printhead 62 has image forming points comprising individual heating elements that vary in temperature to activate different colors in the print medium.

FIGS. 2-5 illustrate four columns 200, 202, 204 and 206 of image forming points 208 located upon one or more printheads 62 and positioned relative to surface 210 of medium 20. Although each of columns 200, 202, 204 and 206 are illustrated as including a total of 24 image forming points 208 for purposes of illustration, the actual number of image forming points 208 in a single column may be larger or smaller depending upon the particular kind of image forming points employed upon printhead 62 and the printing resolution achievable by printhead 62.

For purposes of discussion, the total number of image forming points 208 of each of columns 200, 202, 204 and 206 are illustrated as being divided into four segments or portions 212, 214, 216 and 218. Each portion 212, 214, 216 and 218 includes six image forming points and is mutually exclusive with respect to image forming points of the other portions. Although portions 212, 214, 216 and 218 are illustrated as being bounded by rectangular boxes, such boxes are solely used in the figures to distinguish and identify portions 212, 214, 216 and 218. Furthermore, although portions 212, 214, 216 and 218 are illustrated as including six image forming points, the actual number of portion and number of image forming points within each portion may alternatively be larger or smaller in number.

Figure 2:
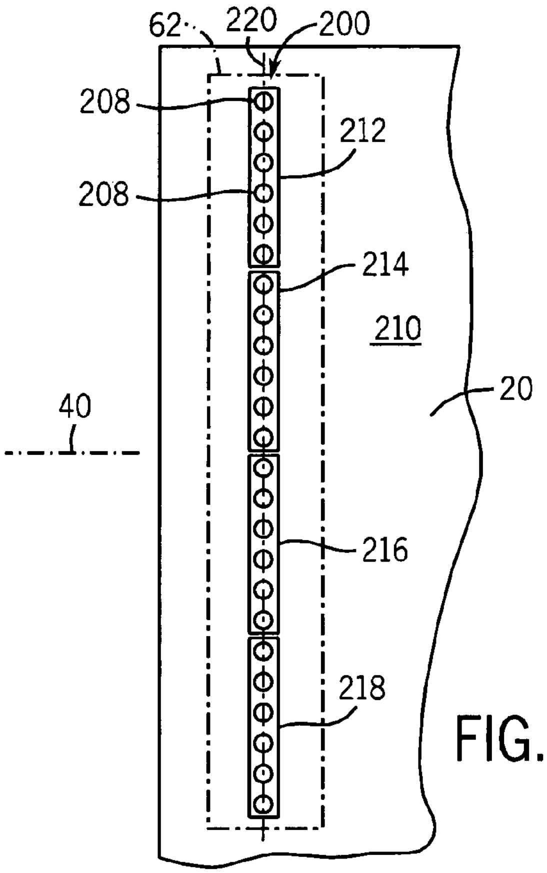
FIG. 2 is a bottom plan view of a first printhead with image forming points having no horizontal errors according to an exemplary embodiment.

FIG. 2 schematically illustrates one example of a printhead 62 having a column 200 of image forming points 208. Column 200 of image forming points 208 is illustrated in alignment with no horizontal errors. In particular, there are no SAD errors in that image forming points 208 along an entire length of column 200 are aligned with one another so as to extend along a single axis 220. No THETA Z errors exist in that axis 220, along which image forming points 208 extend, is not tilted about an axis perpendicular to medium 20. In the particular embodiment shown, when no horizontal errors exist, axis 220 extends perpendicular to scan axis 40.

Figure 3:
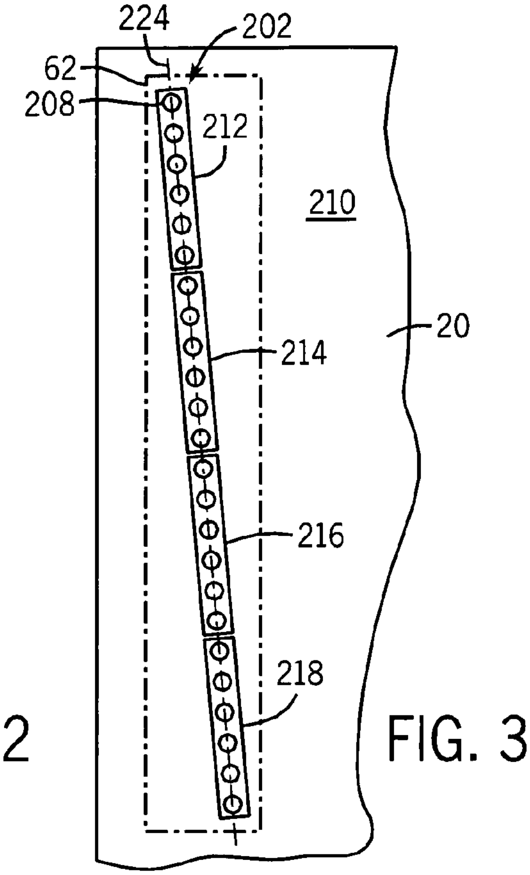
FIG. 3 is a bottom plan view of a second printhead having image forming points having a first horizontal error characteristic according to an exemplary embodiment.
Figure 4:
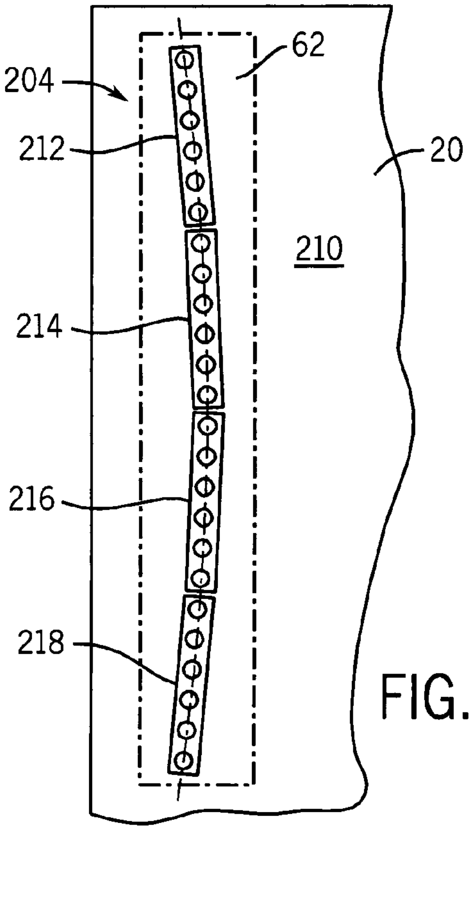
FIG. 4 is a bottom plan view of a third printhead having image forming points having a second horizontal error characteristic according to an exemplary embodiment.
Figure 5:
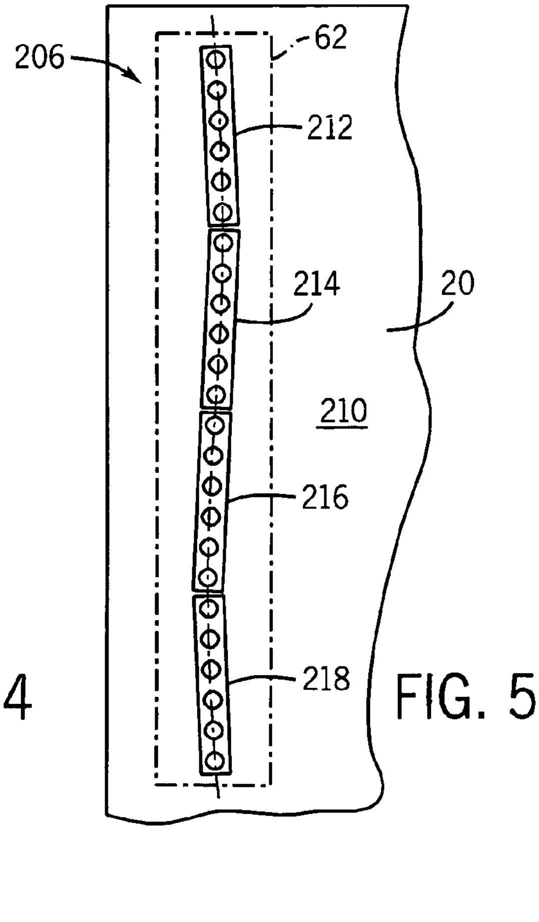
FIG. 5 is a bottom plan view of a fourth printhead with image forming points having a third horizontal error characteristic according to an exemplary embodiment.

FIGS. 3-5 illustrate various horizontal errors that may occur as between image forming points of a single printhead or of multiple printheads. FIG. 3 illustrates printhead 62 in which image forming points 208 do not have a SAD error but have a THETA Z error. Although image forming points 208 all extend along a common axis 224, axis 224 is tilted about an axis perpendicular to the surface 210 of media 20. Although column 202 is illustrated as being tilted such that each of portions of 212, 214, 216 and 218 are sloped in a leftward-leaning direction. Alternatively, portions 212, 214, 216 and 218 may be tilted and sloped in a rightward-leaning direction.

As shown by FIG. 4, column 204 includes SAD horizontal errors. In particular, image forming points 208 of column 204 are horizontally offset from one another by varying horizontal distances and in varying directions such that column 204 is curved. In the particular example illustrated in FIG. 4, portions 212 and 214 are each generally sloped in a leftward-leaning direction, while portions 216 and 218 are each generally sloped in a rightward-leaning direction as seen in FIG. 4. In an alternative example, column 204 may be curved or bowed in an opposite direction wherein portions 212 and 214 are sloped in a rightward-leaning direction while portions 216 and 218 are sloped in a leftward-leaning direction as seen in FIG. 4.

As shown by FIG. 5, image forming points 208 are horizontally offset from one another such that column 206 includes multiple SAD errors or multiple curved portions. In particular, portion 212 is leftward-leaning, portion 214 is rightward-leaning, portion 216 is rightward-leaning and portion 218 is leftward-leaning such that column 206 has a general S shape.

FIGS. 2-5 illustrate but a few examples of various horizontal errors that may occur along a single column of image forming points 208, between portions of distinct columns on a single printhead or between portions of image forming points 208 of distinct columns on distinct printheads 62. Such errors may be due to several factors, including manufacture and placement of the image forming points 208 on printhead 62 and the positioning of the one or more printhead 62 relative to medium 20 by a printhead supporting structure. For example, in printing system 12 shown and described with respect to FIG. 1, print cartridge location 42 of carriage 30 may undesirably support printhead 62 of cartridge 24 in a tilted orientation so as to introduce THETA Z errors. This may be the result of manufacturing tolerances or manufacturing errors. Sensor 37, controller 38 and computer readable media 39 function as a diagnostic system to identify such errors and to also take remedial steps to correct for such errors during printing.

Figure 6:
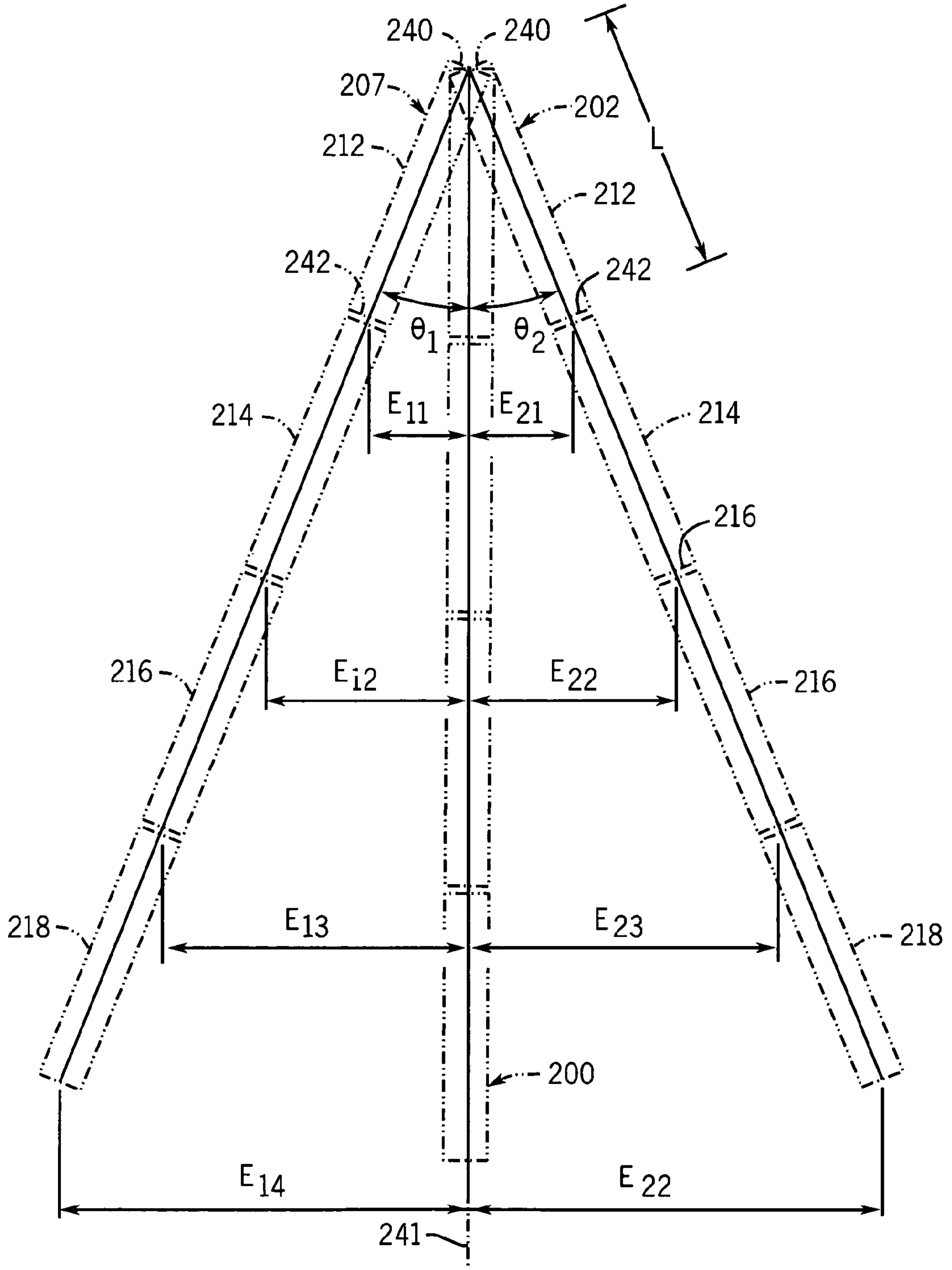
FIG. 6 is a diagram illustrating two columns of image forming points and the horizontal error distances associated with distinct portions of the columns according to an exemplary embodiment.

FIG. 6 is a diagram illustrating horizontal error distances resulting from image forming points being horizontally offset from their intended locations during printing either as a result of manufacturing tolerances or errors occurring during the manufacture of one or more of printheads 62 or as a result of one or more of printheads 62 being improperly supported in position relative to medium 20. FIG. 6 illustrates columns 200, 202 and 207 of image forming points 208. As discussed above with respect to FIG. 2, column 200 is illustrated as having no horizontal errors. As discussed above with respect to FIG. 3, column 202 is illustrated as having a THETA Z error in that column 202 extends tilted in a leftward-leaning direction. Column 207 is similar to column 202 except that column 207 has a THETA Z error in which column 207 is tilted in a rightward-leaning direction. In the example shown, column 207 is tilted with an angle $\Theta_1$ while column 202 is tilted with an angle of $\Theta_2$. Even though top end 240 of portions 212 of columns 202 and 207 are illustrated as being in horizontal alignment with nominal axis 241 along which each of image forming points 208 are intended to be located during printing, the lower ends 242 of portion 212 and the upper ends 242 of portion 214 are horizontally spaced from nominal axis 241 by horizontal error distances $E_{21}$ and $E_{11}$, respectively. Such horizontal error distances $E_{21}$ and $E_{11}$ each equal to L sine Θ, wherein L is the linear length of the particular portion of the column. For example, horizontal error distance $E_{21}$ is equal to the linear length L of portion 212 sine $\Theta_2$.

As shown in the example diagram of FIG. 6, each succeeding portion has a larger horizontal error distance as compared to the preceding portions. Portion 214 of column 202 has an upper end 242 with a horizontal error distance $E_{21}$ and a lower end 244 with a horizontal error distance $E_{22}$. As a result, images created by image forming points 208 from portion 214 of column 202 will be horizontally offset from images created by corresponding image forming points 208 from portion 212 of column 202 by a horizontal error distance of $E_{22}$ minus $E_{21}$. Absent horizontal errors, portions 212 and 214 would both extend along nominal axis 241.

Figure 7:
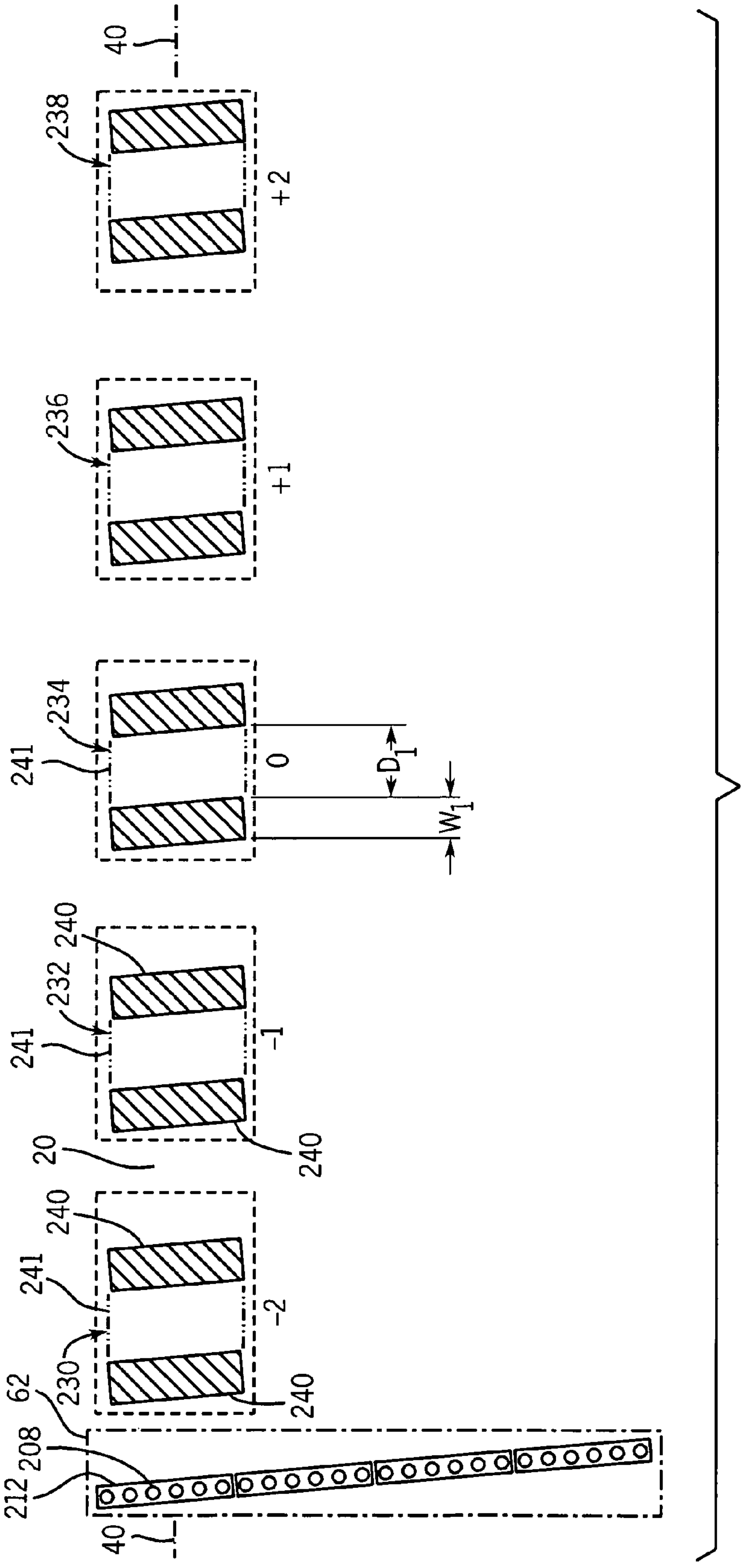
FIG. 7 is a schematic diagram illustrating alignment of a first portion of the second printhead of FIG. 4 with a print medium and printing of reference images upon the print medium using the first portion according to an exemplary embodiment.
Figure 8:
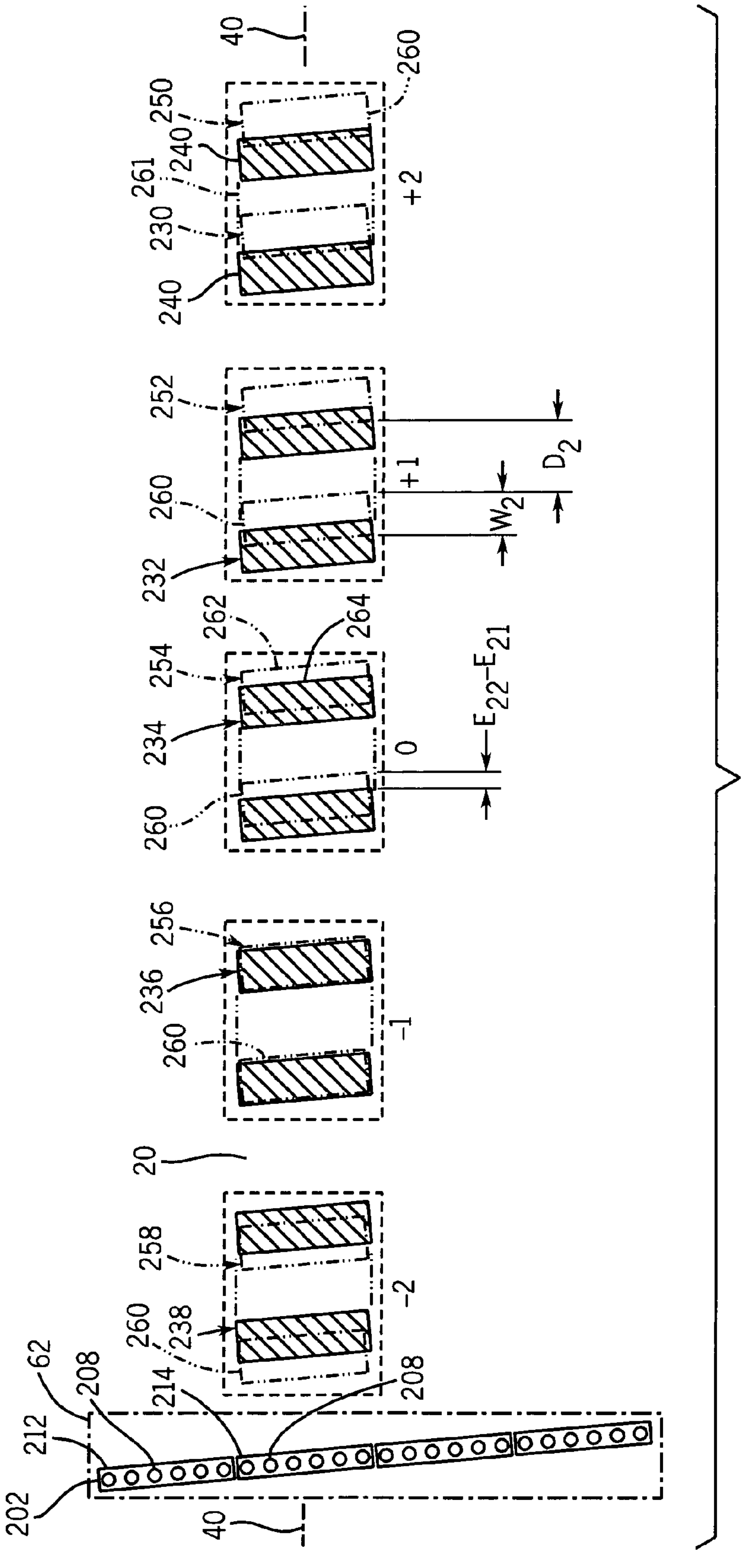
FIG. 8 is a schematic diagram illustrating alignment of the reference diagnostic images with a second portion of the second printhead of FIG. 4 and printing of diagnostic images with the second portion according to an exemplary embodiment.
Figure 9:
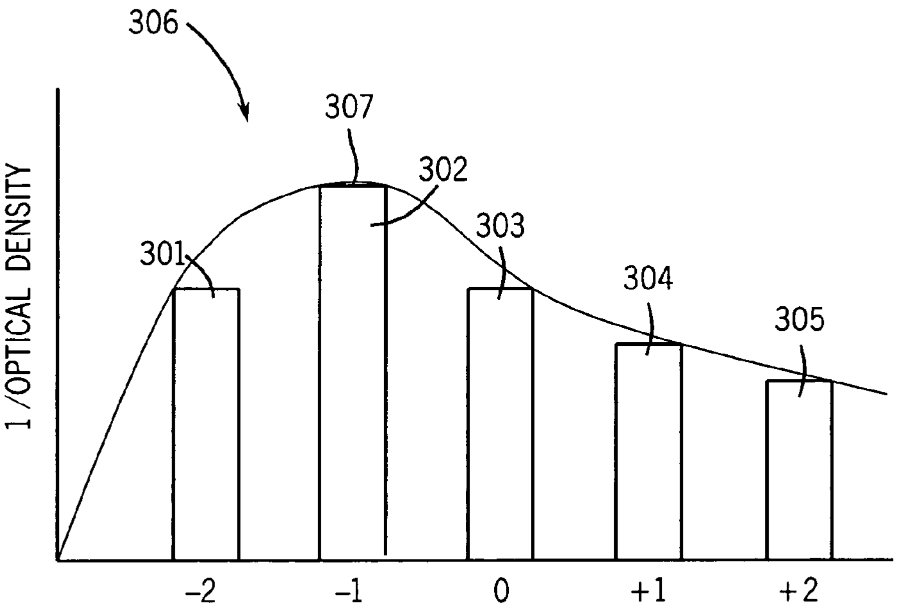
FIG. 9 is a graph illustrating an inverse of optical density versus various offset distances between the pairs of reference and diagnostic images of FIG. 9 according to an exemplary embodiment.

FIGS. 7-9 illustrate the method by which sensor 37, controller 38 and an optional computer readable media 39 diagnose a horizontal printhead error and determine a horizontal printhead error compensation value. As shown by FIG. 7, controller 38 generates control signals which cause media feed 34 to position medium 20 perpendicular to and in alignment with scan axis 40. Controller 38 further generates control signals causing carriage drive 32 to move carriage 30 along scan axis 40 while portion 212 of column 202 of printhead 62 prints or forms a series of reference images 230, 232, 234, 236 and 238. Each reference image 230, 232, 234, 236 and 238 includes a plurality of horizontally spaced individual marks 240. Although each image 230, 232, 234, 236, 238 is illustrated as having two marks 240, as indicated by broken lines 241, each image 230, 232, 234, 236, 238 has a pattern of greater than two marks 240. In one embodiment, each image 230, 232, 234, 236, 238 has at least twenty marks 240. In other embodiments, a greater or fewer number of marks 240 may be formed.

In one embodiment, each of marks 240 is in the form of vertical line. In other embodiments, each mark 240 may have other configurations. Each mark 240 has a width W, and is spaced from an adjacent mark 240 of the same diagnostic image by a distance $D_1$.

In the particular example shown, each mark 240 is formed by a single image-forming actuation of each of image-forming points 208 along portion 212. In other examples, each mark 240 may be formed by multiple image-forming actuations of each image-forming point 208 and portion 212. In addition, consecutive marks 240 of a particular diagnostic image 230, 232, 234, 236 or 238 may be horizontally spaced from one another by varying distances so long as the same non-uniform spacing of marks is employed during the formation of a second of a series of second diagnostic alignment images as described hereafter.

As shown by FIG. 8, controller 38 (shown in FIG. 1) generates additional signals in response to reading instructions from computer readable media 39 or another source, to cause media feed 34 to move medium 20 so as to reposition medium 20 relative to printhead 62. In particular, media feed 34 repositions medium 20 such that the horizontal series of reference images 230, 232, 234, 236 and 238 move into vertical alignment with portion 214 of image-forming points 208 of column 202 (i.e., horizontally across from or directly beneath portion 214). Control signals generated by controller 38 further cause carriage drive 32 to move carriage 30 along scan axis 40 as image-forming points 208 of portion 214 print or form a series of diagnostic alignment images 250, 252, 254, 256 and 258. Diagnostic images 250, 252, 254, 256 and 258 correspond with and at least partially overlie reference images 230, 232, 234, 236 and 238, respectively. Each pair of corresponding diagnostic images and reference images are referred to as patches. Each diagnostic image 250, 252, 254, 256 and 258 includes a plurality of horizontally spaced marks 260. Although each image 250, 252, 254, 256, 258 is illustrated as having two marks 260, as indicated by broken lines 261, each image 250, 252, 254, 256, 258 has a pattern of greater than two marks 260. In one embodiment, each image 250, 252, 254, 256, 258 has at least twenty marks 260. In other embodiments, a greater or fewer number of marks 260 may be formed.

In the example shown, each of marks 260 of a particular diagnostic image 250, 252, 254, 256 and 258 are horizontally spaced from one another by a distance $D_2$. Each of marks 260 has a width $W_2$. In one embodiment, width $W_2$ is substantially equal to width $W_1$ and distance $D_2$ is substantially equal to distance $D_1$ with respect to marks 240. The horizontal spacing between consecutive marks 260 of a particular diagnostic image 250, 252, 254, 256 and 258 may vary so long as the overall spacing pattern between marks 260 of a particular diagnostic image 250, 252, 254, 256 and 258 is identical to the overall spacing pattern of marks 240 of an underlying corresponding diagnostic image 230, 232, 234, 236 and 238.

As further shown by FIG. 8, the marks 260 of diagnostic images 250, 252, 254, 256 and 258 are horizontally offset from their corresponding underlying marks 240 of reference images 230, 232, 234, 236 and 238, respectively, by differing degrees. In particular, marks 240 of diagnostic image 234 are printed upon medium 20 with a zero offset value. Absent horizontal errors between image-forming points 208 of portions 212 and 214, marks 260 of diagnostic image 254 printed with portion 214 will substantially horizontally overlap and align with the underlying marks 240 of reference image 234 when diagnostic image 254 is printed with a zero offset. In other words, the leftward edge and rightward edge of each mark 260 of image 254 will substantially align with the leftward edge and the rightward edge of its corresponding underlying mark 240 of reference image 234. This would be the result had images 234 and 254 been printed using portions 212 and 214 of column 200 of printhead 62 (described above with respect to FIG. 2) which does not include horizontal errors. However, because reference image 234 and diagnostic image 254 are printed utilizing portions 212 and 214 of column 202 of image-forming points 208 which have horizontal errors, marks 260 of diagnostic image 254 do not substantially overlap and align with the underlying marks 240 of reference image 234. In particular, each of marks 260 printed by image-forming points 208 of portion 214 is horizontally misaligned with the corresponding underlying marks 240 of reference image 234 printed by image-forming points 208 of portion 212 by the horizontal error distance $E_{22}$ minus horizontal distance $E_{21}$ (explained in greater detail with respect to FIG. 6). The slope or tilt of marks 240 and 260 of images 234 and 254 as well as the horizontal distance by which marks 260 of image 254 are horizontally misaligned with the corresponding underlying marks 240 of image 240 depends on the angle θ by which the particular column of image-forming points 208 is spaced from the nominal axis 241 (shown in FIG. 6). For example, because column 202 has a leftward-leaning tilt, each of marks 234 and 260 is also leftward-leaning and each of marks 260 has a rightward-most edge 262 that extends to the right of the rightward-most edge 264 of the underlying mark 240.

To determine a compensation value, multiple patches of corresponding reference and diagnostic images are printed across a range of varying offsets between the reference images and the corresponding diagnostic images. In other words, diagnostic images 230, 232, 236 and 238 are printed with respect to their underlying reference images 250, 252, 256 and 258, respectively, at different offset values. Diagnostic image 250 has an offset value of −2, wherein each of marks 260 of image 250 is printed while the printhead providing portion 214 of column 202 is horizontally offset by two units of distance to the left from the horizontal position of the printhead when the corresponding marks 240 of the reference image 230 were printed. Diagnostic image 232 is printed with an offset value of −1, wherein each of marks 260 of image 252 is printed while the printhead providing portion 214 of column 202 is at a horizontal position 1 unit of distance to the left of portion 212 of column 202 when the corresponding underlying marks 240 of reference image 232 were printed. Diagnostic image 254 has an offset value of +1, wherein each mark 260 of image 254 is printed while the printhead providing portion 214 of column 202 is positioned 1 unit of distance to the right as compared to the location of portion 212 of column 202 when the corresponding underlying marks 240 of reference image 236 were printed. Diagnostic image 258 has an offset value of +2, wherein each of marks 260 of image 258 is printed while the printhead providing portion 214 of column 202 is horizontally offset two units of distance to the right of the horizontal position of portion 212 of column 202 when each of the corresponding underlying marks 240 of reference image 238 were printed.

As shown by FIG. 9, controller 38 (shown in FIG. 1) further generates control signals which cause carriage drive 32 to move sensor 37 (shown in FIG. 1) across each pair of diagnostic images printed at each of the offset distances (−2, −1, 0, 1, 2). In the particular embodiment illustrated, sensor 37 is moved across each of the pairs of diagnostic images after all of the diagnostic images have been printed. In alternative applications, sensor 37 is scanned or moved across each pair of diagnostic images at each offset value immediately following the actual printing of the individual pair of diagnostic images.

As sensor 37 is moved across each of the pairs of diagnostic images, sensor 37 detects an optical density of each pair of diagnostic images. Electrical signals representing the sensed optical density are transmitted to controller 38. Based upon such sensed optical densities, controller 38 determines an horizontal printhead offset error compensation value. In particular, as shown in FIG. 8, as the extent to which each pair of diagnostic images align and overlap with one another is increased, the surface area of medium 20 which is not printed upon (i.e., the amount of white space) increases. A perfect alignment of a pair of diagnostic images which is the result of no horizontal errors would result in the greatest white space and the lowest optical density.

In the particular example, the inverse of each of the sensed optical densities 301, 302, 303, 304, 305 at each of the different offset distances (−2), (−1), zero, (+1) and (+2), respectively, are then fit to a smooth curve 306. A maximum 307 of this curve is interpolated as shown in FIG. 9. The offset value corresponding to a maximum of the smooth fit curve is identified as the optimum horizontal printhead error compensation value for each of image forming points 208 of portion 214 of column 202.

In lieu of forming a smooth fit curve to identify an optimum horizontal printhead error compensation value, controller 38 may alternatively identify the horizontal printhead error compensation value for portion 214 of column 202 based upon the sensed optical densities using other calculation techniques. For example, controller 38 may alternatively fit sensed optical density values to a smooth fit curve of optical density versus offset distances, wherein the offset value corresponding to the minimum of the curve is interpolated to determine the horizontal printhead error compensation value. In some other applications, the horizontal printhead error compensation value may be deemed to be the particular offset distance which corresponds to the lowest optical density without any interpolation being performed. Although the method illustrated in FIG. 8 depicts five pair of diagnostic images having substantially uniformly varied offset distances with an equal number of diagnostic image pairs being printed in both directions relative to the zero offset, the method may alternatively include a greater or fewer number of such diagnostic pairs having non-uniformly spaced offset distances and having a total number of diagnostic image pairs that are non-symmetrically centered about a zero offset.

The overall process for identifying an optimum horizontal printhead error compensation value for portion 214 of column 202 with respect to portion 212 of column 202 is repeated for each of portions 216 and 218 with respect to portion 212 of column 202. Likewise, horizontal printhead error compensation values may also be determined for each of portions 214, 216 and 218 with respect to portion 212 of columns 204 and 206. These horizontal printhead error compensation values are utilized by controller 38 to calibrate the positioning of printhead 62 during printing. Controller 38 generates control signals based upon such horizontal printhead error compensation values which cause carriage drive 32 to move printhead 62 along scan axis 40 in such a way so as to account for the identified horizontal errors.

Figure 10:
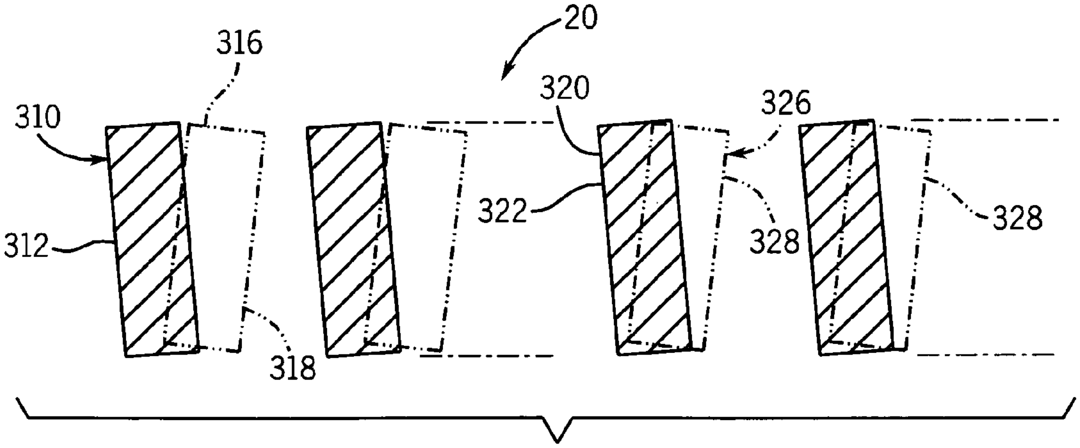
FIG. 10 illustrates two pairs of reference and diagnostic images printed upon a medium for determining a horizontal printhead error compensation value for portions of image forming points of a printhead that are tilted in opposite directions according to an exemplary embodiment.

FIG. 10 illustrates the determination of a printhead error compensation value for image forming points by comparing two portions tilted in opposite directions such as with those portions of columns 204 and 206 (shown in FIGS. 4 and 5). In the illustrated example, the horizontal error compensation value is determined for image forming points 208 of portion 218 of column 204 by comparing diagnostic images printed using portion 218 of column 204 with reference diagnostic images printed using portion 212 of column 204. Controller 38 (shown in FIG. 1) generates control signals which cause a reference diagnostic image 310 having marks 312 to be printed using portion 212 of column 204 (shown in FIG. 4) upon a print medium. Controller 38 further generates control signals which cause media feed 34 to move medium 20 to position image 310 across from portion 218 of column 204 (shown in FIG. 4). Thereafter, a diagnostic image 316 having marks 318 is printed using image forming points 208 of portion 218 of column 204. This is done while portions 212 and 218 of printhead 62 are positioned at the same horizontal position along a nominal vertical axis by carriage drive 32.

This process is repeated in an identical fashion except that a diagnostic image printed by portion 218 of column 204 is printed while the printhead 62 is horizontally offset from the first position or from the nominal axis by varying offset distances and directions with respect to a zero offset. For example, FIG. 10 illustrates a second pair of diagnostic images including a third diagnostic image 320 having marks 322 printed by portion 212 of column 204 while printhead 62 is in a third horizontal position and a fourth diagnostic image 326 having marks 328 printed by portion 218 of column 204 while printhead 62 is at a third position horizontally offset from the first horizontal position. Because portions 212 and 218 are tilted in opposite directions, marks printed by portions 212 and 218 can never perfectly align and overlap with one another. However, as shown by FIG. 10, at a certain offset value, the extent of overlap and the extent of alignment between the pair of diagnostic images is maximized. This offset distance corresponds to or may be used to interpolate an optimum horizontal printhead compensation value for image forming points 208 of portion 218 with respect to the location of image forming points 208 of portion 212 which is used as a reference.

Figure 11:
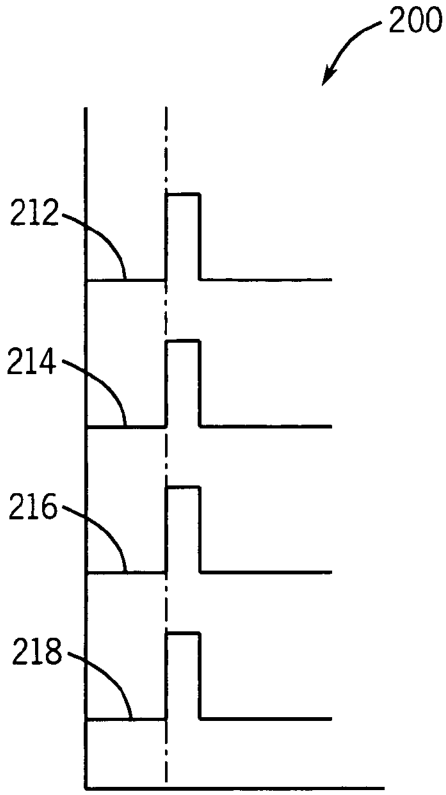
FIG. 11 is a timing diagram illustrating the printing of a vertical line using portions of the printhead shown in FIG. 2 according to an exemplary embodiment.

FIGS. 11-14 are timing diagrams illustrating printing of an image upon medium 20 using columns 200, 202, 204 and 206 of printhead 62 after the movement of printhead 62 by carriage 32 has been calibrated based upon the determined horizontal error compensation values for each of portions 214, 216 and 218 with respect to portion 212 of each of columns 200, 202, 204 and 206. FIGS. 11-14 illustrate the timing at which image forming points 208 of portions 212, 214, 216 and 218 of columns 200, 202, 204 and 206, respectively, are actuated to an image forming state to form identical images. FIG. 11 illustrates the creation of the image using column 200. As noted above, column 200 is ideal in that it avoids THETA Z or SAD errors. As a result, the horizontal printhead error compensation values for each of portions 214, 216 and 218 is zero. In the particular illustration, image forming points 208 of portions 212, 214, 216 and 218 are simultaneously actuated to image forming states to form horizontally aligned vertical marks.

Figure 12:
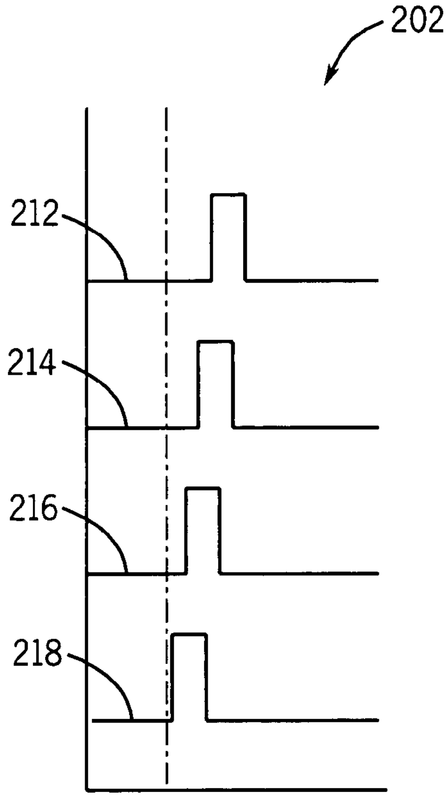
FIG. 12 is a timing diagram illustrating the printing of a vertical line using portions of the printhead shown in FIG. 3 according to an exemplary embodiment.
Figure 13:
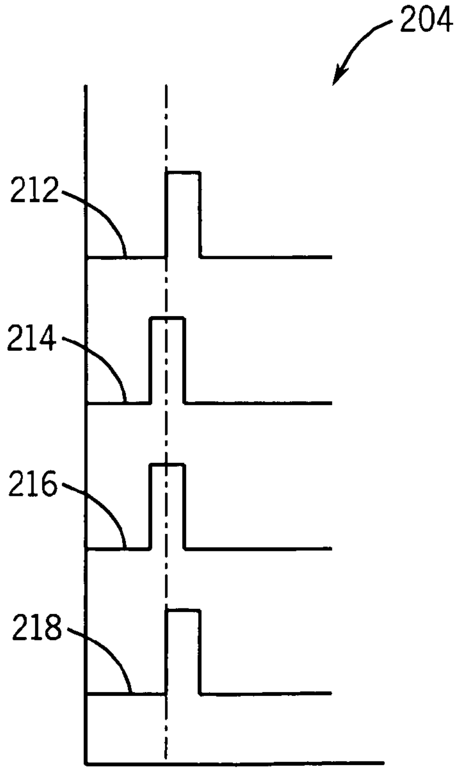
FIG. 13 is a timing diagram illustrating the printing of a vertical line using portions of the printhead shown in FIG. 4 according to an exemplary embodiment.
Figure 14:
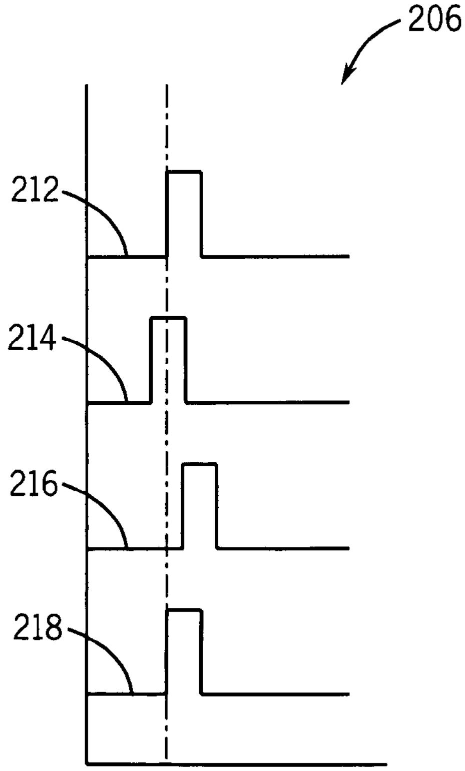
FIG. 14 is a timing diagram illustrating the printing of a vertical line using portions of the printhead shown in FIG. 5 according to an exemplary embodiment.

FIG. 12 illustrates the timing diagram for printing a vertical image using image forming points of column 202. As described above, a negative offset distance and a negative horizontal error compensation value was determined for each of the image forming points 208 of portion 214 with respect to portion 212. In this particular instance, the horizontal error compensation value corresponded to a horizontal distance of −1 unit of distance (shown in FIG. 8). This negative horizontal error compensation value results in image forming points 208 of portion 214 being actuated to image forming state to form images upon medium 20 prior to the actuation of image forming points 208 of portion 212 of column 202. Based upon this horizontal error compensation value, controller 38 (shown in FIG. 1) generates control signals such that printing by image forming points 208 of portion 214 will occur at horizontal location X and that any printing by image forming points 208 of portion 212 will occur when printhead 62 is at horizontal location X plus one unit of distance. FIG. 12 further illustrates either the relative timing at which image forming points 208 of portions 216 and 218 are actuated to an image forming state or the relative positioning of printhead 62 supporting portions 216 and 218 during printing of an image. FIGS. 13 and 14 illustrate the same timing or relative horizontal location of printhead 62 for portions 212, 214, 216 and 218 of columns 204 and 206.

Figure 15:
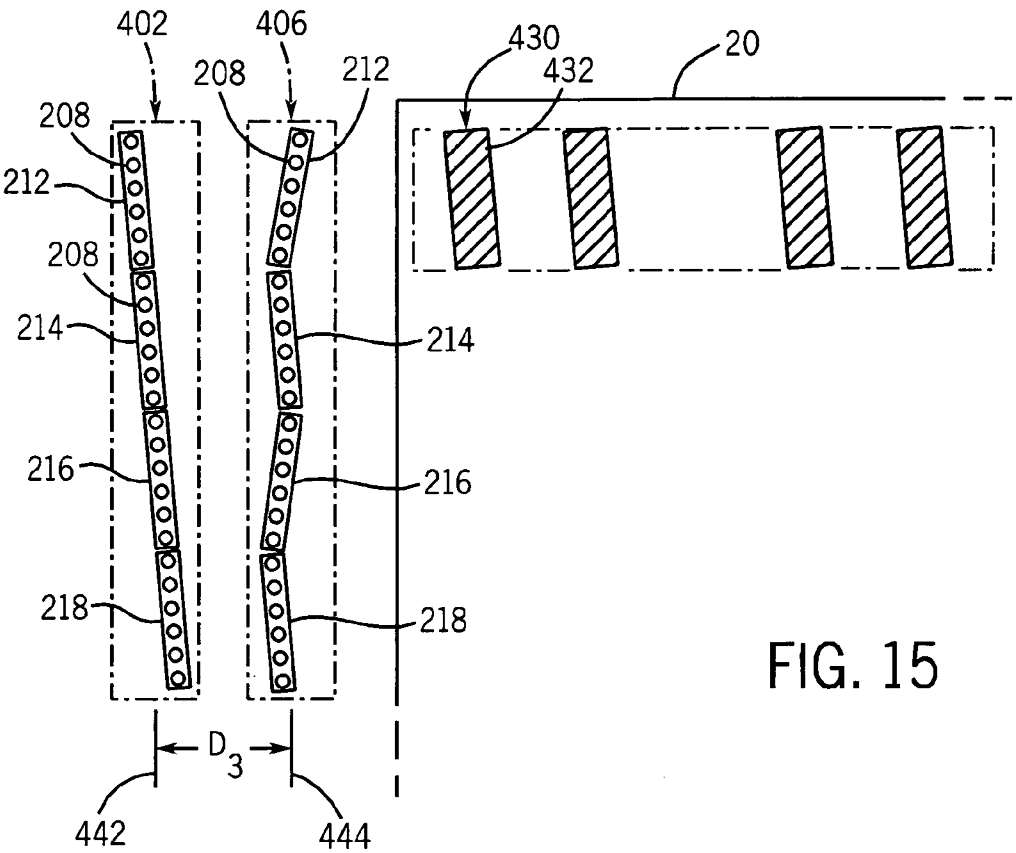
FIG. 15 is a schematic diagram illustrating a first portion of a first column of image forming points in alignment with a print medium and a reference image formed upon the medium using the first portion of image forming points according to an exemplary embodiment.
Figure 16:
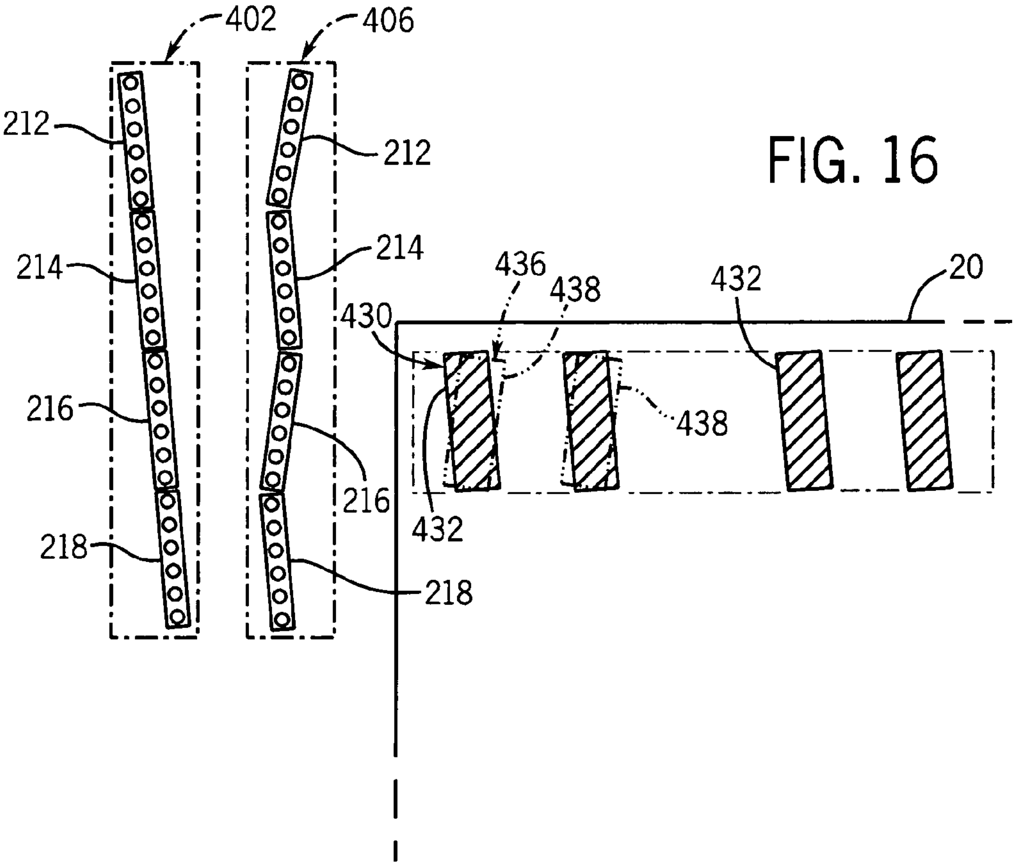
FIG. 16 is a schematic diagram illustrating the medium of FIG. 15 moved to align the reference image with a second portion of a second column of image forming points and a diagnostic image printed upon the medium using the second portion of image forming points according to an exemplary embodiment.

Although the method described with respect to FIGS. 2-10 involves printing a pair of diagnostic images using portions of a column of image forming points on a single printhead 62 to determine a horizontal error compensation value for one of the portions using the other of the portions as a reference, the method may also be applied by printing a pair of diagnostic images using distinct portions of image forming points from two distinct columns of a single printhead or of two distinct columns of different printheads. FIGS. 15 and 16 illustrate the determination of a horizontal error compensation value for a first portion of image forming points 208 with reference to a second portion of image forming points contained in a distinct column. As shown by FIG. 15, controller 38 generates control signals which cause media feed 34 to position medium 20 across from columns 402 and 406 of image forming points 208. For purposes of illustration only, columns 402 and 406 are illustrated as being divided into four portions 212, 214, 216 and 218. Once medium 20 has been properly positioned, control signals generated by controller 38 (shown in FIG. 1) cause carriage drive 32 to move columns 402 and 406 along scan axis 40 as a reference diagnostic image 430 having marks 432 is printed by image forming points 208 of portion 212 of column 402. In particular applications, carriage drive 32 stationery positions column 402 opposite medium 20 as image forming points 208 of portion 212 are actuated to an image forming state. This temporary halting of movement carriage 30 by carriage drive 32 is extremely short in nature and is many times imperceptible. In other applications, carriage drive 32 may be configured to continuously transport column 402 along scan axis 40 as image forming points 208 are actuated to an image forming state.

Once diagnostic image 430 has been formed, controller 38 (shown in FIG. 1) generates control signals that cause media feed 34 to reposition medium horizontally across from portion 216 of column 406. Control signals generated by controller 38 further cause carriage drive 32 to move column 406 of image forming points 208 and to print second alignment diagnostic image 436 having marks 438. In the particular example being illustrated in FIGS. 15 and 16, columns 402 and 406 are designed to extend along nominal axes 442 and 444, respectively, separated by a nominal horizontal design distance $D_3$. For example, distance $D_3$ may be the spacing between two columns on a single printhead or may be the spacing between two columns on two distinct printheads. When determining a horizontal error compensation value for portion 216 of column 406 with portion 212 of column 402 as a reference, controller 38 is configured to generate control signals for controlling movement of carriage drive 32 and positioning of the one or more printheads 62 providing columns 402 and 406 based upon distance $D_3$. In the particular example, each mark 432 is printed while the one or more printheads is located at horizontal position X. Controller 38 generates control signals such that for each mark 432 printed by portion 212 of column 406, a corresponding alignment mark 438 is printed by portion 216 while the one or more printheads is at a horizontal location X minus distance $D_3$.

This overall process of printing a pair of diagnostic images (a reference diagnostic image and a alignment diagnostic image) is repeated at one or more additional offset distances from the zero offset. As described above, an optical density is detected for each of the combined pair of diagnostic images. Based on these optical densities, an optimal horizontal error compensation value is determined and is utilized by controller 38 to general control signals when printing non-diagnostic images using image forming points 208 of portion 216 of column 406.

In the particular example described, each segment or portion of each pen is calibrated relative to a single reference segment or portion of a single pen for every print speed and every print direction. In the particular example described, the reference diagnostic image for the single reference segment is printed using a color having high contrast with LED colors employed. According to one example in which the image forming points are configured to dispense ink, a reference diagnostic image is formed or is printed using a portion of image forming points of a printhead that dispenses black ink. For calibrations between different printheads, the light emitting diode of sensor 37 has a high contrast with the color of the image formed by the second portion of image forming points which are being calibrated. When a column being calibrated which has nozzles that are interlaced relative to a reference column, a change in dot overlap with horizontal offsets is maximized while the impact of vertical trajectory errors is minimized. This is achieved by printing a second series of reference diagnostic images and alignment diagnostic images offset vertically to provide a vertical line to provide a series of vertical lines that are fully filled with no gaps. Alternatively, a vertical offset may be introduced so that the interlaced image forming points of the first portion of image forming points are in a vertically aligned relationship with a second portion of image forming points.

Overall, embodiments of the present method as carried out by printing system 12 following instructions from optional computer readable media 39 may be configured to align all portions or portions of all cartridges in all print directions and speeds to compensate for cartridge-to-cartridge, column-to-column, THETA Z, SAD shape and bidirectional errors at each print speed. Although embodiments of the method have been described with reference to printing system 12 which employs image forming points comprising nozzles of inkjet printhead 62, the described embodiments may also be employed in other printing systems having other configurations or other types of image forming points. Although the method has been described for compensating for each of pen-to-pen, column-to-column, THETA Z, SAD shape and bi-directional errors, the method may alternatively be employed to compensate for fewer than all of these occurrences.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method for calibrating one or more printheads, the method comprising:

printing a first reference image using a first portion of image forming points of a first printhead;

printing a first diagnostic image using a second portion of image forming points of the first printhead, wherein the first portion of image forming points comprises a first segment of a column of image forming points and wherein the second portion comprises a second segment of the column of image forming points on the first printhead and wherein the first reference image and the first diagnostic image at least partially overlap, wherein the first reference image is printed while the first printhead is at a first horizontal position and wherein the first diagnostic image is printed while the first printhead is at the first horizontal position;

detecting a first optical density of the combined first reference image and the first diagnostic image; and determining a compensation value based upon the first optical density;

printing a second reference image with the first portion of the first printhead while the first printhead is at a second horizontal position;

printing a second diagnostic image with the second portion while the first printhead is at a third horizontal position positively offset from the second horizontal position by a first offset distance;

detecting a second optical density of the combined second reference image and the second diagnostic image, wherein the compensation value is additionally based upon the second optical density.

2. The method of claim 1 including advancing the print media a distance such that the first reference image and the diagnostic image are in vertical alignment.

3. The method of claim 1 including adjusting a time at which the first portion dispenses ink based upon the compensation value.

4. The method of claim 1 including forming images using the first portion and the second portion at different times based upon the compensation value.

5. The method of claim 1, wherein the first reference image includes at least one mark having a width and wherein the first offset distance is no greater than the width.

6. The method of claim 1, wherein the first horizontal position and the second horizontal position have a common location.

7. The method of claim 1, wherein the first reference image and the first diagnostic image have non-overlapping portions in the horizontal direction.

8. The method of claim 1 including:

printing a third reference image with the first portion while the first printhead is at a fourth horizontal position;

printing a third diagnostic image with the second portion while the first printhead is at a fifth horizontal position positively offset from the fourth horizontal position by a second offset distance greater than the first offset distance; and detecting a third optical density of a combination of the third reference image and the third diagnostic image, wherein the compensation value is determined based additionally upon the third optical density.

9. The method of claim 8, wherein the third reference image includes at least one mark, wherein each mark has a width and wherein the third offset distance is less than the width.

10. The method of claim 8, wherein the third horizontal position is offset from the second horizontal position in a first direction and wherein the fifth horizontal position is offset from the third horizontal position in the first direction.

11. The method of claim 10 including:

printing a fourth reference image with the first portion while the first printhead is at a sixth horizontal position;

printing a fourth diagnostic with the second portion while the first printhead is at a seventh horizontal position negatively offset from the sixth horizontal position by a third distance offset; and detecting a fourth optical density of a combination of the fourth reference image and the fourth diagnostic image, wherein the compensation value is determined based additionally upon the fourth optical density.

12. The method of claim 11 including:

printing a fifth reference image using the first portion while the first printhead is at an eighth horizontal position;

printing a fifth diagnostic image using the second portion while the first printhead is at a ninth horizontal position negatively offset from the eighth horizontal position by a fourth distance greater than the third distance; and detecting a fifth optical density of a combination of the fifth reference image and the fifth diagnostic image, wherein the compensation value is determined based additionally upon the fifth optical density.

* * * * *